March 14, 1967 B. F. VITALE 3,309,493

MULTIPLE BONDING

Filed Feb. 21, 1964 5 Sheets-Sheet 1

INVENTOR
Benedict F. Vitale
BY
Robert E. Strausser
ATTORNEY

INVENTOR
Benedict F. Vitale
BY
Robert E. Strauser
ATTORNEY

INVENTOR
Benedict F. Vitale
BY
Robert E. Strauser
ATTORNEY

March 14, 1967 B. F. VITALE 3,309,493

MULTIPLE BONDING

Filed Feb. 21, 1964 5 Sheets-Sheet 4

INVENTOR
Benedict F. Vitale
BY
Robert E. Strausser
ATTORNEY

MULTIPLE BONDING

Filed Feb. 21, 1964 5 Sheets-Sheet 5

INVENTOR
Benedict F. Vitale
BY
Robert E. Strausser
ATTORNEY

United States Patent Office 3,309,493

Patented Mar. 14, 1967

3,309,493
MULTIPLE BONDING

Benedict F. Vitale, Auburn, N.Y., assignor to Sylvania Electric Products Inc., a corporation of Delaware Filed Feb. 21, 1964, Ser. No. 346,556
10 Claims. (Cl. 219—79)

This invention relates to multiple bonding and more particularly to the bonding process and apparatus means utilized in fabricating an aperture mask-supporting frame assembly for use in a cathode ray tube.

It is conventional in certain types of multi-beam color cathode ray tubes to employ a metallic aperture mask within the tube in spaced relationship to an adjacent color cathodoluminescent screen formed on the inner surface of the tube face panel. Such a mask may have rectangular or substantially round apertures therein in accordance with the configuration of color screen employed.

One type of such color screen comprises a multitude of three-dot triads of red, green, and blue phosphors adheringly disposed on the face panel in a repetitive pattern of predetermined sequence in registry with substantially round apertures in a foraminous mask. The minuteness of these color dots and the multiplicity thereof necessitates precisely spaced positioning of the shadow mask relative to the tube face panel during the several dot formation procedures. In addition, the alignment of the mask apertures with the screen dots in the finished tube is a requisite for subsequent specific electron beam excitation thereof. To accomplish this precision positioning and alignment requires exactness in the assembly of the foraminous mask to a circular supporting frame adapted for discrete orientation within the panel. Conventionally, the periphery of the mask is formed with a rim to facilitate compatible encompassing circumferential engagement with the frame. Peripheral bonding of the mask with the supporting frame provides a mask-frame assembly that has the required structural rigidity to facilitate positional preciseness when suitably disposed adjacent the face panel.

The fabrication of this mask-frame assembly is usually accomplished by positioning the circularly formed foraminous shadow mask and support frame on a compatibly shaped turret oriented adjacent a single set of welding electrodes. Laterally indexing these electrodes effects a single weld thereby initially bonding the mask to the frame at one peripheral point. Since additional welds are required to produce a structurally strong assembly, a second weld is made after rotating the turret containing the mask-frame assembly 180 degrees, in either direction, from the first weld. A third weld is added after the turret is rotated 90 degrees from the second weld, and a fourth weld follows a turret movement of 180 degrees from the third weld. Each of the resultant 90 degree segments of the mask-frame assembly is sequentially filled in with spaced welds at predetermined intervals to complete the peripheral bonding of the assembly.

There are disadvantages inherent in the described fabrication procedure since the position of the mask to the frame is not firmly established until at least three substantially equi-spaced weld spots are made around the periphery of the mask-frame assembly. Since the peripheral rim of the mask circumferentially encompasses the frame in capped engagement there is a nominal dimensional tolerance between the I.D. of the mask and the O.D. of the frame to facilitate suitable mating thereof, this will be referenced as perimetric "rim surplusage" in the ensuing description. This rim surplusage results in a buildup of rim material in a confined peripheral region unless distribution means is employed. When bonding the mask-frame assembly with a single set of welding electrodes, consumation of the first weld substantially accentuates the shifting of the mask rim to frame spacing on the assembly periphery diametrically opposite the first weld spot. Subsequent weld about the periphery unevenly distributes the spacing buildup of rim material in a manner to accentuate a buildup of rim material and cause varying degrees of distortion of the rim and the adjacent mask contour which affects the uniformity of aperture placement especially in the peripheral portion of the mask. Additionally, the single weld spot bonding procedure, as described, is by nature a slow production process.

Accordingly, an object of the invention is to reduce the aforementioned disadvantages and to improve the fabrication of mask-frame assemblies.

Another object is the utilization of a process and associated equipment which will firmly fix the mask to the frame with the initial weld index.

An additional object is the utilization of a process and associated equipment which will more evenly distribute the mask rim surplusage and reduce mask distortion resulting from the mask to frame welding operation.

Yet another object of the invention is the utilization of a process and associated equipment which will simplify and expedite the mask to frame welding operation regardless of the shape of the mask-frame assembly.

The foregoing objects are achieved in one aspect of the invention by the provision of a multiple bonding process and its associated apparatus which facilitates the making of a plurality of simultaneous bonds discretely spaced around the aperture mask to frame perimeter thereby distributing the mask rim surplusage and minimizing mask distortion regardless of the perimetric shape of the assembly.

For a better understanding of the present invention, together with other and further objects, advantages, and capabilities thereof, reference is made to the following disclosure and appended claims in connection with the accompanying drawings in which:

Figures 1, 2:
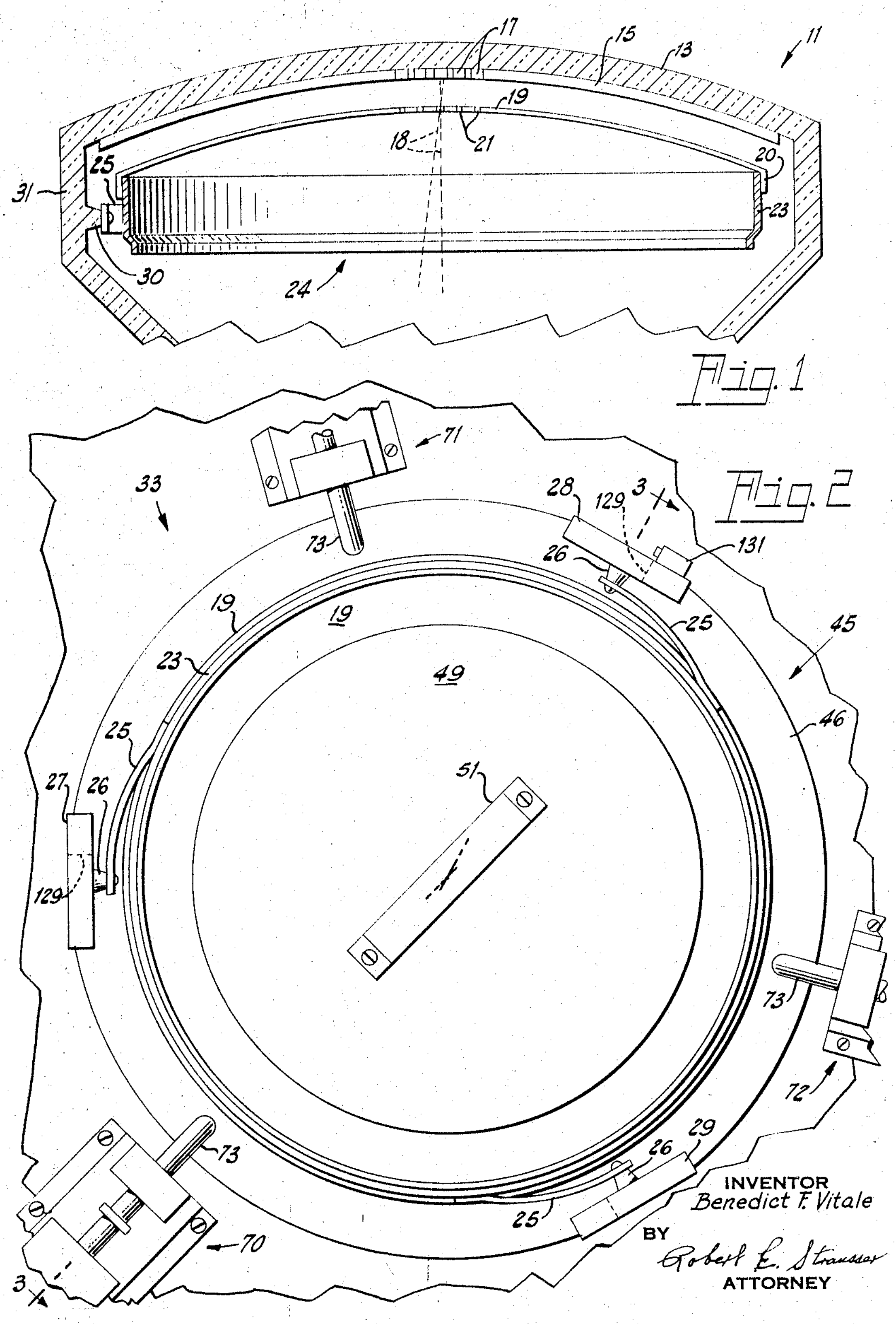
FIG. 1 is a sectional view showing the location of the mask-frame assembly in the face portion of a cathode ray tube.
FIG. 2 is a plan view of one embodiment of the invention.

There is shown in FIG. 1 a portion of a cathode ray tube 11 having an arcuately formed face panel 13. Suitably disposed on the inner surface thereof is a cathode cathodoluminescent screen 15 comprising multitudinous phosphor color dot triads 17. In spaced relationship to the screen is a metallic aperture mask, such as foraminous shadow mask 19, formed with a curvature substantially matching that of the panel and having a plurality of apertures 21 therein, one for each group of phosphor triads. The plural electron beams 18, two of which are shown, emerging from the separate guns, not shown, are controlled to pass through the same aperture 21 in the foraminous mask to simultaneously land on a specific color dot in each triad 17. This illustrates the precise degree of alignment accuracy that is essential. To maintain this accuracy, necessary rigidity is achieved by perimetrically bonding the mask 19 to a metallic supporting frame 23 which is positionally oriented within the face panel portion of the tube 11 as a shadow mask frame assembly 24. A plurality of resilient springs 25, suitably bonded to the exterior of the frame, are formed to engage positioning projections 30 integral to the interior of the wall 31 of the panel portion of the tube. In this manner the shadow mask 19 is rigidly supported and accurately positioned relative to the screen 15.

Figure 3:
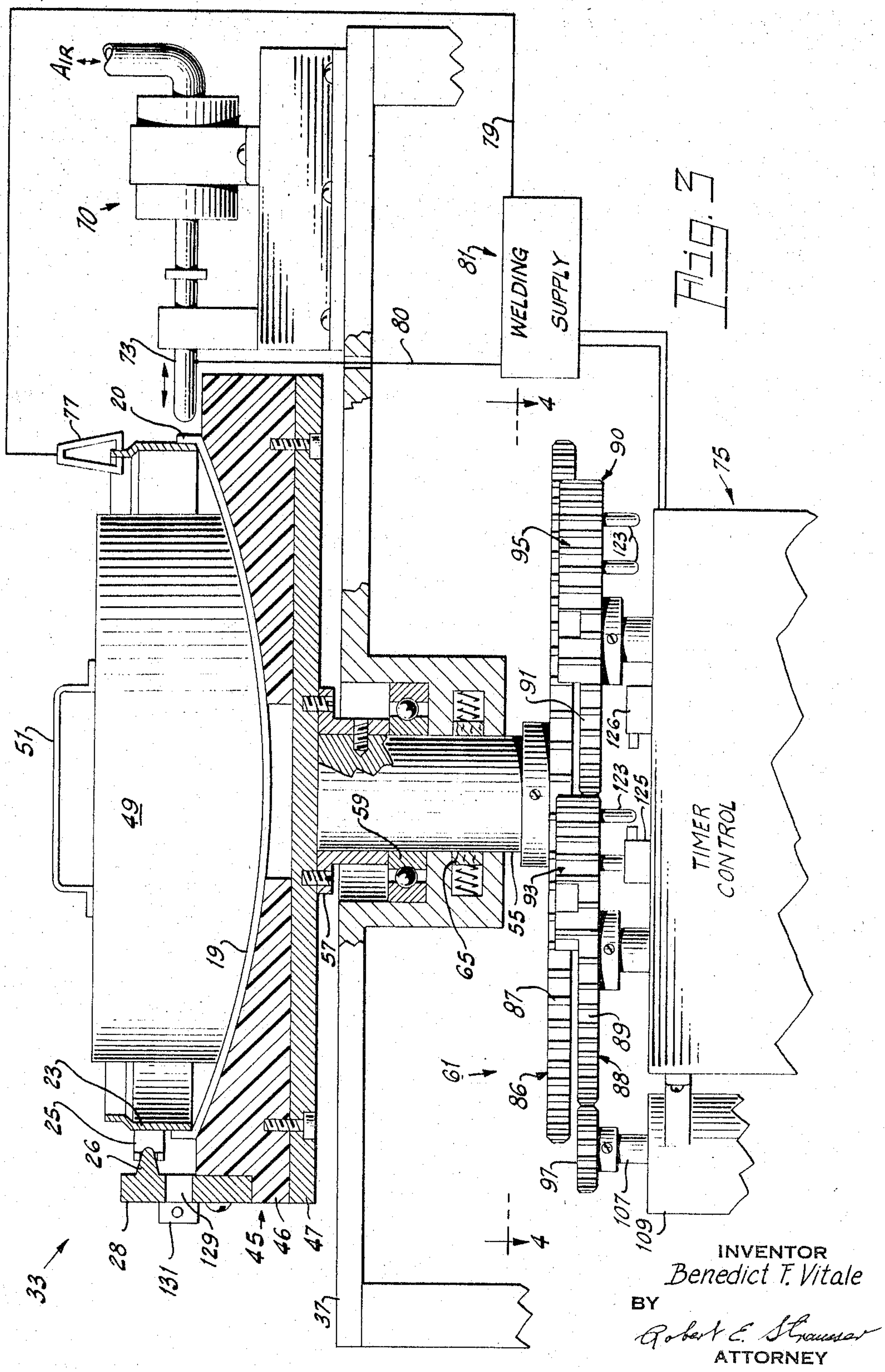
FIG. 3 is a partially sectioned illustration taken along line 3—3 of FIG. 2.

The bonding of the foraminous mask 19 to the supporting frame 23 is accomplished by a multiple welding procedure in a bonding apparatus 33 as illustrated in FIGS. 2 and 3. This apparatus comprises a fixed base table 37 upon which are mounted a plurality of welding stations 70, 71, and 72, three in this instance, positioned in surrounding relationship to a rotatable support member 45 upon which is positioned the mask and frame assembly 24 for bonding. The support member 45 has an upper portion 46 of nonabrasive material such as fiber or plastic of which the upper surface is substantially concave.

In greater detail, the mask 19, shaped by a previous operation, is formed with a perimetric rim 20 that provides capping engagement with the frame 23. To facilitate assembly, the mask is placed face down in the concavity of the rotatable plano-concave support member 45; the curvature of the concavity being compatible with that of the mask. The supporting frame 23 is positioned within the upstanding perimetric rim 20 of the mask; and the several resilient springs 25 integral to the frame 23 and equipspaced perimetrically therearound are engaged with placement detents 26 integral to upstanding positioners 27, 28, and 29 affixed to rotatable support member 45. Thus, the mask and frame are properly oriented in predetermined contiguous concentric and spatial alignment.

To adequately provide seating engagement of the mask with the concave curvature of the support member 45, a positioned weight 49, as of fiber or plastic and having a lateral dimension smaller than the internal dimension of the frame 23 is placed on the mask 19. The weight has a suitable handle 51 attached to the top surface thereof to facilitate placement and removal.

The nonabrasive upper portion 46, of rotatable support member 45, has a metal plate 47 attached to the under surface thereof. The end of a longitudinal shaft 55 is axially secured to the metal plate 47 by a flanged collar 57 which seats on bearing 59 suitably disposed in base table 37. Thus, rotational movement of support member 45 is facilitated. Mechanical means 61 for providing predetermined partial rotation thereto will be fully described later.

A plurality of welding stations 70, 71, and 72 are positioned relative to the perimeter of the support member 45. Each welding station has a laterally movable electrode 73 actuated by a timing control 75; the pressured air for which is furnished from a source not shown. It is evident that solenoid means could be utilized for this movement if desired. The forward lateral movement of the welding electrode 73 brings it into pressured contact with the perimetric rim of the mask. The supporting frame 23 becomes the second welding electrode common to all of the welding stations by means of clamping the contact 77 of a common electrical welding conductor 79 thereto. The common welding conductor 79 and conductors 80 from each of the electrodes 73 are suitably connected to welding supply 81 and mechanical means timing control 75.

Figure 7:
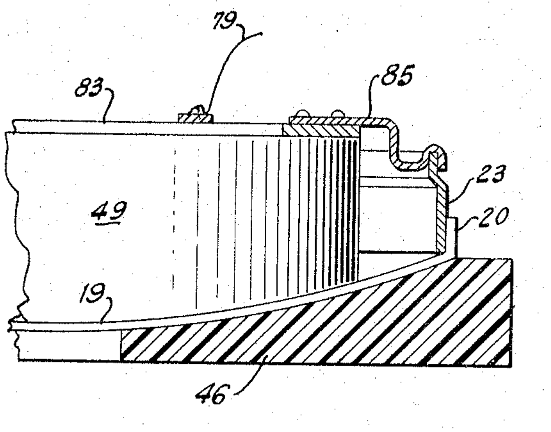
FIG. 7 is a sectional view illustrating another embodiment of the second class electrode contact.

In FIG. 7 there is shown another embodiment of making contact between the common welding condutor 79 and the frame 23. A peripheral electrically conductive ring 83 disposed on substantially the top surface of the positioned weight 49 has the common welding conductor 79 suitably attached thereto. A plurality of resilient connective means 85, formed to make electrical contact with supporting frame 23, are spacedly attached to the conductive ring 83. By this embodiment, placement of the positional weight 49 also plurally connects the common welding conductor 79 with the frame 23.

As previously mentioned, it is desirous to make a spaced plurality of simultaneous bonds between the mask and frame. This is accomplished by simultaneous activation of all of the welding stations by the timing control 75. After the initial affixing bonds, which in this instance are spaced substantially 120 degrees apart, additional sets of spaced intervening welds are effected around the perimetric rim of the assembly in a manner to minimize mask distortion by consummating a substantially even distribution of the mask rim surplusage. Means 61 for partially rotating the support member 45 in an indexing manner and actuating the timing control therefrom will be described in detail.

Figure 4:
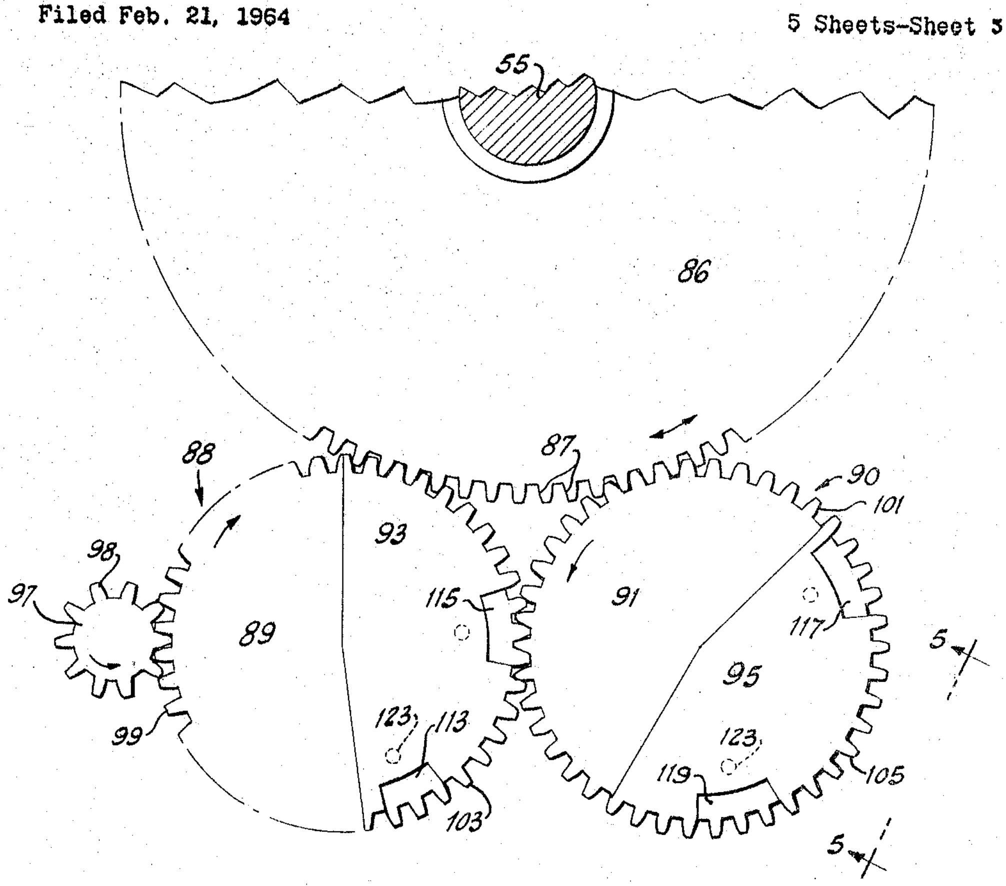
FIG. 4 is a plan view taken along line 4—4 of FIG. 3.

As shown in FIGS. 3 and 4, a planar gear 86, containing teeth 87, is secured to shaft 55. For purposes of presenting formulated relationship, to be later explained planar gear 86 will be symbolically designated as G and the total peripheral teeth defining the circumference of this planar gear will be denoted as *tt*G. Two pinion gears 88 and 90 designated as first and second pinions $P^1$ and $P^2$ respectively, are individually axially disposed and oriented relative to planar gear 86 and drive gear 97. In greater detail, pinion gears 88 and 90 are of related two plane construction wherein the major gear planes 89 and 91 contain teeth 99 and 101 while the minor planes comprising elevated segments 93 and 95 contain teeth 103 and 105 in discretely spaced arrangements. The full peripheral complement of teeth on major planes 80 and 91 are symbolically designated as $ttP^1$ and $ttP^2$ respectively, while the partial complements of discretely positioned teeth on the minor plane segments are denoted as $stP^1$ and $stP^2$.

The drive gear 97 is affixed to the drive shaft 107 of electric motor 109. The teeth 98 of the drive gear 97 mesh with the teeth 99 of the major plane 89 of the first pinion gear 88 which, in turn, mesh with the teeth 101 of the major plane 91 of the companion or second pinion gear 90. Planar gear 86, being on the same level as elevated segments 93 and 95 of the first and second pinion gears 88 and 90, is positioned so that a segment of the teeth 87 of the planar gear 86 meshes first, with the teeth 103 of elevated segment 93 and, secondly, with the oppositely moving teeth 105 of elevated segment 95. This provides to planar gear 86 a partial rotative bidirectional movement, first in one direction and a like return therefrom.

Figure 5:
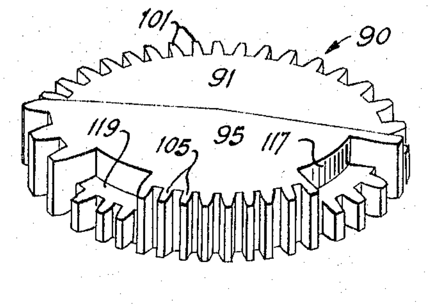
FIG. 5 is a perspective view relative to line 5—5 of FIG. 4.

As shown in FIGS. 4 and 5, each of the elevated segments contains sections where the teeth are missing. These cutouts 113 and 115 in segment 93, and 117 and 119 in segment 95 produce indexing or momentary stoppage in the partial rotative movement of planar gear 86 during which welding is consummated. For each of the elevated segments 93 and 95, the partial complements of teeth and the cutouts therebetween comprise the respective segment spans having peripheral lengths symbolically designated as $ssP^1$ and $ssP^2$.

Associated with each of the cutouts mentioned above is a pin or projection 123 seated in and extending from the surface of the respective pinion gears. As indicated in FIGS. 3 and 4, these pins extend in discrete positions from the lower surfaces of both pinion gears 88 and 90 and are oriented to sequentially contact the trip or pressure switches 125 and 126 which are electrically connected, by means not shown, with the timer 75 to actuate the welding stations and initate the groups of simultaneous welds around the perimeter of the mask-frame assembly.

By utilizing three welding stations, as afore-described, to accomplish the repetitive sets of simultaneous welds, it is necessary to partially rotate the support member 45 one-third of a revolution; this means that the directly related planar gear 86 should be moved one-third of a revolution. This in terms of the total peripheral teeth (*tt*G), defining the circumference, on gear 86 is:

Circumferential span of partial rotative movement $= ttG/3$

The partial complements of teeth on the elevated pinion segments ($st$P[1] and $st$P[2]), which drive the planar gear 86 in either direction, must equal $ttG/3$, therefore, $$ttG/3 = stP^1 = stP^2$$

With reference to the two pinion gears 88 and 90, the elevated segments spans ($ssP^1$ and $ssP^2$), i.e., the peripheral length of the segment which accumulatively includes the segment teeth and the cutout portions, determines the size of the pinion gears. In order to properly time the two pinion gears 88 and 90 so that the motion in one direction imparted to the planar gear 86 by segment 93 is completed before moving segment 95 of the second pinion gear comes into engagement to reverse the movement of gear 86, it is essential that each of the segment spans ($ssP^1$ and $ssP^2$) be slightly less than one-half the total peripheral teeth ($ttP^1$ and $ttP^2$) of the major pinion planes 89 and 91, thus the relationship may be expressed as:

$$ssP^1 < t^{tP^1}/2 \text{ and } ssP^2 < t^{tP^2}/2$$

where $ttP^1$ and $ttP^2$ are circumferential representations of the complements of teeth for each of the respective pinion gears 88 and 90. This relationship holds true regardless of the number of welding stations employed. For example, if four welding stations are utilized, as will be described in a subsequent embodiment, the portion of the planar gear utilized, i.e., the span of rotative movement, is proportional to one-fourth of the perimeter of the respective mask-frame assembly, which in terms of the planar gear is: $ttG/4$. For "$x$" number of welding stations the span of rotative movement is $ttG/x$.

As aforedescribed, the total complement of teeth comprising each elevated segment is equal to the number of teeth on the utilized peripheral portion of the planar gear; consequently, the pinion gears would be diametrically smaller for a four station welding procedure than they would be for a three station set up. Although differing in sequential placement, the number of cutouts and teeth in one elevated segment equals the number of cutouts and teeth in the other. If a greater number of welding stoppages are desired, more cutouts must be included in each elevated segment. Thus, the diametric size of the pinion gears is also influenced by the number of peripheral welds desired.

Operationally, as illustrated in FIGS. 3, 4, and 5, the mechanical drive mechanism 61, for discretely rotating support member 45, functions as follows: Drive gear 97 imparts a clockwise motion to the first pinion gear 88 by engaging the teeth 99 on the major plane thereof. The rotation of first pinion gear 88 moves elevated segment 93 therearound whereby the teeth 103 engage the teeth 87 of planar gear 86 and cause it to begin a counterclockwise movement. The pin 123 associated with the cutout 113 in the first pinion elevated segment activates the trip switch 125 which simultaneously activates the three welding stations 70, 71, and 72 to initially bond the foraminous mask 19 to the supporting frame 23. The cutout 113, having no teeth, effects momentary stoppage of planar gear 86 for consummation of the initial welds. The continual movement of the first pinion gear 88 brings the sequential teeth 103 of the segment 93 into engagement with the teeth 87 of the planar gear 86 to further rotate the planar gear until cutout 115 is brought into position to again effect momentary stoppage of the planar gear and make another set of welds. As illustrated in FIG. 4, the set of welds made at cutout 115 are positioned substantially midway between the initial welds; thus, the mask-frame assembly 24 has been perimetrically bonded at six spaced locations at substantially 60 degrees apart. Continued movement of segment 93 unidirectionally advances planar gear 86 as long as the teeth of the two gears are engaged which orients the mask-frame assembly relative to the welding station positions of the initial welds.

Since the two pinion gears 88 and 90 mutually counter-rotate through engagement of the peripheral teeth 99 and 101 respective to each, the two pinions are timed to provide engagement of the elevated segment 95 of the second pinion gear 90 with the planar gear 86 as soon as elevated segment 93 of the first pinion gear 88 has completed engagement therewith. Segment 95 imparts reverse motion to planar gear 86 and thence to support member 45. The cutouts 117 and 119 in segment 95 affording predetermined stoppages for additional fill-in sets of simultaneous welds during the course of the return movement of planar gear 86. Index overtravel is prevented by tensioned friction shoes 65, as of fiber or felt, disposed in the base table 37 for contiguous contact with shaft 55. Two cutouts 117 and 119, and associated pins 123, are shown; but a greater number could be incorporated as desired to effect a greater multiplicity of mask-frame welds providing the total teeth and cutouts are equal for each of the elevated segments. It will be noticed that there is no cutout and pin in substantially the mid-region of elevated segment 95 since a set of mask-frame welds has previously been consummated for that region of control by cutout 115 and pin 123 in elevated segment 93.

In referring to FIGS. 2 and 3, rotatable support member 45, as controlled by the aforedescribed mechanical means, moves through a one-third arcuate span whereby the upstanding positioners 27, 28, and 29 move to and fro between respective pairs of electrode stations thereby effecting perimetric welds around the mask-frame assembly. Each upstanding positioner has an indentation 129 formed to accommodate the passage thereinto of welding electrodes 73 thereby facilitating substantially complete perimetric welding.

Upstanding positioner 28 has a pressure switch 131 oriented thereon, which, while not shown, is electrically connected to timer 75. This switch inactivates the rotational mechanical movement 61 at the end of each welding cycle by coming in contact with electrode 73 of welding station 71. Reactivation may be manually or electronically initiated in a manner conventional to such control.

Figure 6:
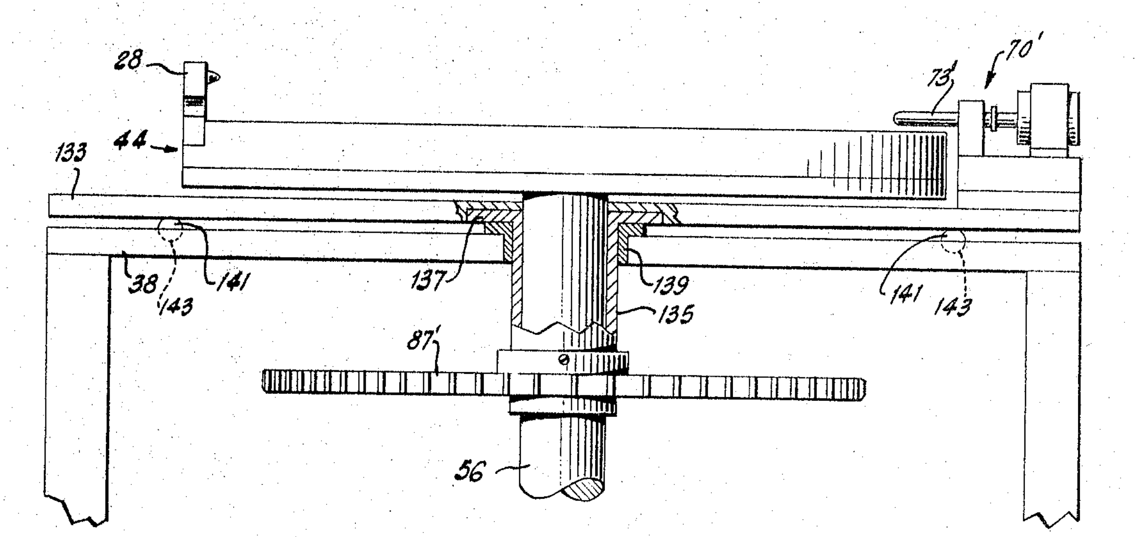
FIG. 6 is a partially sectioned view showing another embodiment of the invention.

An alternate embodiment, as illustrated in FIG. 6, has a fixed support member 44 secured to a stationary shaft 56 extended through the base table 38. This support member is formed to hold the frame 23 and mask 19 in predetermined contiguous concentric and spatial alignment as described for the previous embodiment. A plurality of welding stations 70' are spacedly positioned on a metallic rotatable stage 133 which is axially affixed to a flanged sleeve 135. Provision is made in base table 38 for a rotational slidable contact between a table-mounted bearing 139 and the flange portion 137 of sleeve 135. The I.D. of sleeve 135 is such as to encompass fixed shaft 56 to provide for slidable rotation therearound. The free end of the sleeve 135, extending beneath the base table is adapted to receive, by fixed collar attachment, a planar gear 87' forming part of the mechanical rotating means, such as 61 aforedescribed. Additional supporting means is afforded to the rotating welding station stage 133 in the form of a plurality of ball bearings 141 revolvable in compatible sockets 143 in the top of table 38. In this embodiment of the invention the welding station stage, by mechanical means 61, is made to move in a rotational manner through a definite arc predetermined by the number of welding stations utilized. Thus, the collective movement of the stations relative to the perimeter of the frame and mask assembly facilitates the discrete deposition of spaced sets of simultaneous welds thereabout.

Thus, the mask rim surplusage is substantially evenly distributed and peripheral mask distortion minimized. The reciprocal lateral movement of the welding electrodes 73' is accomplished in the manner already described, and the welding supply and timing means are likewise similar to those utilized in the first embodiment of the invention.

While the simultaneous bondng operation, thus far shown and described has concerned mask-frame assemblies of substantially circular contour, the perimetric welding of assemblies of other shapes such as oval, square, or rectangular is easily facilitated in another embodiment of the invention.

Figure 8:
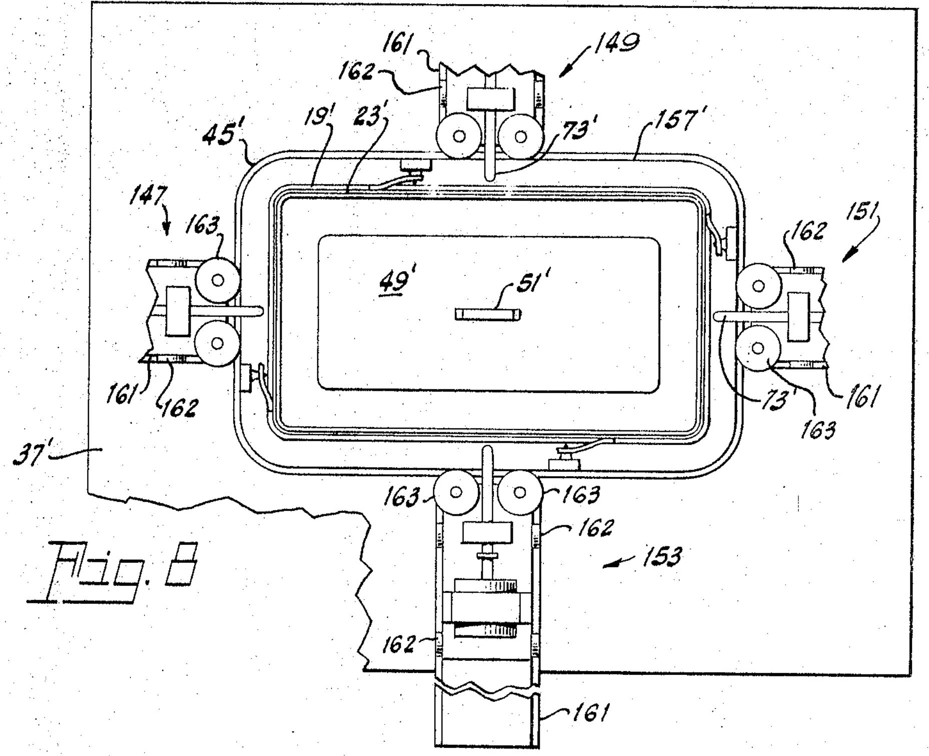
FIG. 8 is a plan view showing still another embodiment of the invention.

In referring to FIG. 8, there is shown a plan view of a bonding apparatus wherein a substantially rectangular foraminous mask 19' and supporting frame 23' are suitably positioned on a substantially related rectangular rotatable support member 45' and orientationally seated thereon by positioned weight 49' having a handle 51'.

The basic rotative mechanical structure and apparatus shown in FIG. 3, for the most part, likewise apply to the embodiment illustrated in FIG. 8. However, as will be subsequently explained, the four welding stations 147, 149, 151, and 153 of FIG. 8 differ in some respects from the type of welding station 70 depicted in FIG. 3. Support member 45' is likewise rotatable by an axially mounted longitudinal shaft and associated mechanical means, not shown, but similar to shaft 55 and mechanical means 61 of FIG. 3. Support member 45', has perimetrically therearound, a formed guide surface 157' defining the continuous peripheral contour of the mask-frame assembly positioned thereon. The timing control 75 and welding supply 81 of FIG. 3 also apply to the apparatus shown in FIG. 8.

Four welding stations 147, 149, 151, and 153 are illustrated in FIG. 8; the feasibility of a plurality of stations such as this was previously mentioned in this specification. These stations have reciprocal first welding electrodes 73' pneumatically controlled as aforedescribed. The individual stations are separated, one from the other, by one-fourth the perimetric distance around the rectangular support member 45'.

Figure 9:
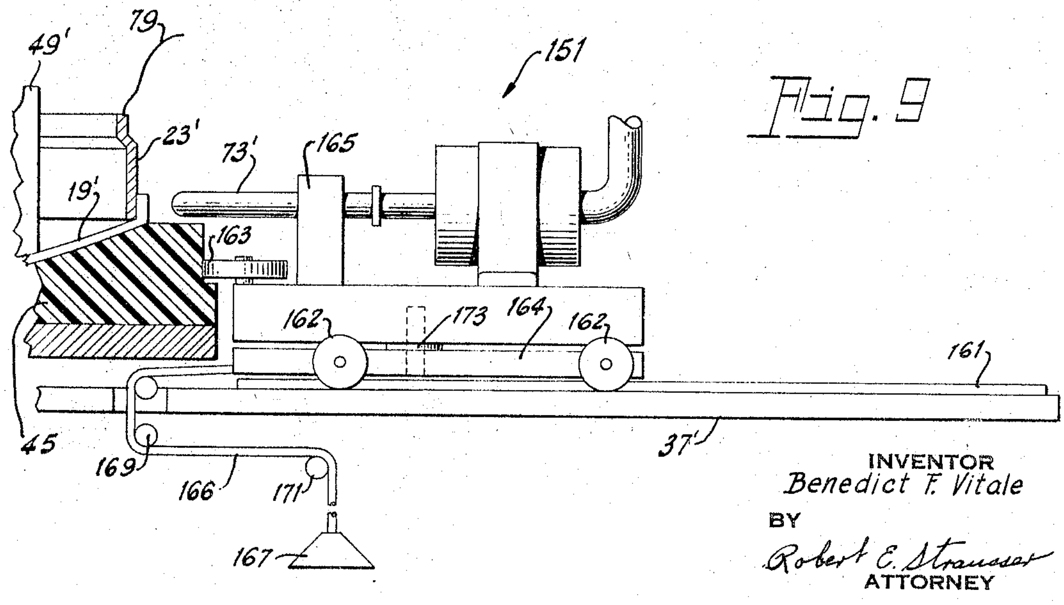
FIG. 9 is a sectional view showing a welding station of the embodiment illustrated in FIG. 8.

As shown in FIGS. 8 and 9, each station basically comprising a welding head 165 and a traction portion 164, has an associated track 161 secured to the base table 37' and formed to provide for independent traverse movement of the specific station therealong by rollers 162 on a bottom traction portion 164. Guide means for each station in the form of a suitable pair of fiber wheels 163, integral to the welding head 165 thereof, compatibly engage the guide surface 157' of support member 45' to provide for tracking of the stations therewith. Means for tensioning the guide wheels 163 of each station against the guide surface 157' is provided by a flexible cable 166 and weight 167 arrangement guided over pulleys 169 and 171.

Each station is capable of independent arcuate pivot by means of an axis swivel bearing 173 suitably separating the welding head 165 and the traction portion 164.

As support member 45' moves in a rotational manner to and fro through the predetermined perimetric distance in accordince with the number of welding stations utilized, independent traverse and pivotal movement is provided to each welding station as the guide wheels follow the guide surface. The repetitive sets of simultaneous perimetric welds are consummated as previously described.

Thus, there has been described an advantageous bonding process whereby a foraminous shadow mask and a compatible supporting frame are fabricated as an assembly for use in a color cathode ray tube. After initially affixing the mask to the frame by a plurality of discretely spaced perimetric welds, the assembly is subsequently indexingly positioned to fill in the intervening perimetric spaces with sequential sets of simultaneous welds thereby equalizing the mask rim surplusage and minimizing the mask distortion usually inherent to the operation. By the simultaneous multiple welding process and associated equipment, permetric bonding for any shape of mask-frame assembly—round, oval, square, rectangular, or any modifications thereof—is expeditiously accomplished.

While there have been shown and described what are at present considered the preferred embodiments of the invention, it will be obvious to those skilled in the art that various changes and modifications may be made therein without departing from the scope of the invention as defined by the appended claims.

What is claimed is:

1. The process for making a color cathode ray tube foraminous shadow mask-supporting frame assembly having the mask portion thereof formed with a perimetric rim thereabout to provide capping engagement with said frame wherewith there is perimetric mask rim surplusage therearound, said process comprising the steps of:

orienting said mask face down in a support member having compatible curvature to support said mask;

applying seating engagement means to insure the seating of said mask in said support member to maintain the proper curvature thereof;

assembling said frame within said perimetric rim of said mask in a manner that said mask provides capped relationship to said frame;

attaching an electrical conductor to said frame to facilitate the subsequent utilization of said frame as a common welding electrode in a subsequent welding operation;

initially affixing said mask to said frame by a welding operation utilizing a plurality of welding stations substantially equi-spaced perimetrically one from the other and disposed to effect a plural set of simultaneous discretely placed substantially equi-spaced perimetric welds in conjunction with said common welding electrode to bond said rim to said frame in a manner to substantially distribute said rim surplusage therearound;

supplying relative indexed movement between said mask-frame assembly and said welding stations in a predetermined sequential manner; and disposing simultaneously a second set of welds positioned substantially midway between said initial welds to further distribute said rim surplusage;

effecting a simultaneous plurality of welds in a spaced repetitive manner around said perimetric rim of said assembly between said initial welds and said mid-welds to consummate final distribution of said rim surplusage thereby providing optimum resultant alignment of said mask to said frame.

2. The process for making a color cathode ray tube foraminous shadow mask-supporting frame assembly according to claim 1 wherein said relative movement is accomplished by at least partially rotating said mask-frame assembly support member in an indexing manner relative to non-rotating welding stations.

3. The process for making a color cathode ray tube foraminous shadow mask-supporting frame assembly according to claim 1 wherein said plurality of descretely placed substantially equi-spaced initial perimetric welds are at least three in number.

4. The process for making a color cathode ray tube foraminous shadow mask-supporting frame assembly according to claim 1 wherein said relative movement is accomplished by at least partially rotating said welding stations in an indexing manner relative to a non-rotating mask-frame assembly support member.

5. The apparatus for making a cathode ray tube shadow mask-supporting frame assembly comprising:

a base table;

a plano-concave support member mounted on said base table and formed for perimetrically holding said frame and said mask in assembled predetermined continguous concentric and spatial alignment, the curvature of the concavity being compatible with the mask;

seating engagement means to provide seating engagement of said mask in said support member;

a plurality of welding stations positioned relative to the perimeter of said support member, each of said welding stations having a first welding electrode capable of simultaneous reciprocal lateral movement;

a common electrical welding conductor having connective means formed for contacting said supporting frame to provide said frame as a common second welding electrode;

means for supplying relative movement between said support member and said welding station in a predetermined indexing manner;

a welding supply for activating said welding stations; and timing means to provide predetermined welding and actuation of reciprocal electrode movement to facilitate the making of repetitive sets of perimetrically spaced simultaneous welds.

6. The apparatus for making a cathode ray tube shadow mask-supporting frame assembly according to claim 5 wherein said seating engagement means is in the form of an insulative positional weight having a concave mating surface compatible with that of the mask and related support member and having lateral dimensions smaller than the internal dimensions of said frame.

7. The apparatus for making a cathode ray tube shadow mask-supporting frame assembly according to claim 5 wherein said support member has an axis and is formed to provide at least partial rotational movement to said frame-mask assembly, and wherein said relative movement between said support member and said welding stations is supplied by at least partially rotating said support member.

8. The apparatus according to claim 7 wherein said support member has a formed guide surface defining the continuous peripheral contour of said mask-frame assembly, and wherein each of said stations is capable of arcuate pivot and independent traverse movement of predetermined scope, and wherein each of said stations has guide means formed to be compatible with said guide surface of said support member to provide for tracking of said stations therewith in a predetermined manner.

9. The apparatus for making a cathode ray tube shadow mask-supporting frame assembly according to claim 5 wherein said support member is fixedly mounted on a stationary shaft relative to said base table, and wherein said plurality of welding stations are positioned on a rotatable stage having an axis to facilitate collective rotational movement of said stations relative to the perimeter of said mask-frame assembly, and wherein said relative movement between said support member and said welding stations is supplied by at least partially rotating said stage about said support member in an indexing manner.

10. The apparatus according to claim 9 wherein said fixed support member has a formed guide surface defining the continuous peripheral contour of said mask-frame assembly, and wherein each of said stations on said rotatable stage is capable of arcuate pivot and independent traverse movement of predetermined scope, and wherein each of said stations has guide means formed to be compatible with said guide surface to provide for tracking of said stations therewith in a predetermined manner.

References Cited by the Examiner

UNITED STATES PATENTS

| | | | |
|---|---|---|---|
| 2,107,093 | 2/1938 | Terrell | 219—159 X |
| 2,625,734 | 1/1953 | Law | 29—25.13 |
| 2,767,457 | 10/1956 | Epstein | 29—25.13 |
| 2,817,276 | 12/1957 | Epstein | 29—25.13 |
| 2,903,319 | 9/1959 | Kuryla et al. | 29—25.13 X |

RICHARD M. WOOD, *Primary Examiner.*

B. A. STEIN, *Assistant Examiner.*